United States Patent
Wang et al.

(10) Patent No.: US 11,695,353 B2
(45) Date of Patent: Jul. 4, 2023

(54) SAFE TORQUE OFF (STO) CIRCUIT AND METHOD FOR STO CIRCUIT

(71) Applicant: ABB BEIJING DRIVE SYSTEMS CO., LTD., Beijing (CN)

(72) Inventors: Jibin Wang, Beijing (CN); Petri Havanto, Espoo (FI); Ville Kärjä, Helsinki (FI); Ville Samuel Forsström, Helsinki (FI)

(73) Assignee: ABB BEIJING DRIVE SYSTEMS CO., LTD., Beijing (CN)

( * ) Notice: Subject to any disclaimer, the term of this patent is extended or adjusted under 35 U.S.C. 154(b) by 0 days.

(21) Appl. No.: 17/755,870

(22) PCT Filed: Jan. 22, 2020

(86) PCT No.: PCT/CN2020/073899
§ 371 (c)(1),
(2) Date: May 10, 2022

(87) PCT Pub. No.: WO2021/147031
PCT Pub. Date: Jul. 29, 2021

(65) Prior Publication Data
US 2022/0385213 A1    Dec. 1, 2022

(51) Int. Cl.
*H02P 3/18* (2006.01)

(52) U.S. Cl.
CPC ...................... *H02P 3/18* (2013.01)

(58) Field of Classification Search
CPC .......... H02P 3/18; H02P 27/06; H02P 29/024; H02P 21/36
See application file for complete search history.

(56) References Cited

U.S. PATENT DOCUMENTS

| 9,209,718 B2 * | 12/2015 | Sykes ............... H02H 7/0844 |
| 10,193,330 B1 | 1/2019 | Bartz et al. |
| 2002/0084766 A1 * | 7/2002 | Schwesig ............ H02P 3/18 318/801 |

(Continued)

FOREIGN PATENT DOCUMENTS

| CN | 101908833 A | 12/2010 |
| CN | 105099213 A | 11/2015 |

(Continued)

OTHER PUBLICATIONS

International Search Report and Written Opinion, issued by the ISA/CN National Intellectual Property Administration; regarding corresponding patent application Serial No. PCT/CN2020/073899; dated Nov. 2, 2020; 9 pages.

*Primary Examiner* — Thai T Dinh
(74) *Attorney, Agent, or Firm* — Greenberg Traurig, LLP

(57) ABSTRACT

Embodiments of present disclosure relate to a Safe Torque Off (STO) circuit and a method for the STO circuit. The STO circuit has an input suitable for receiving an input signal, channels coupled to the input in parallel, wherein each of the channels includes a switch, a level conversion circuit, and an isolation circuit connected in series. Each isolation circuit being configured to be turned on when the respective switch is closed and to be turned off when the respective switch is opened. Each of the channels also includes an inverter module, a control unit, a first switch unit, and a second switch unit.

20 Claims, 2 Drawing Sheets

(56) References Cited

U.S. PATENT DOCUMENTS

| | | | | |
|---|---|---|---|---|
| 2010/0309589 A1* | 12/2010 | Ueki | ................... | H02M 1/08 |
| | | | | 361/18 |
| 2015/0295524 A1* | 10/2015 | Kangas | ................ | H02P 29/02 |
| | | | | 318/452 |
| 2015/0340960 A1 | 11/2015 | Takayama et al. | | |
| 2017/0163202 A1* | 6/2017 | Sarkimaki | ............... | H02P 27/06 |

FOREIGN PATENT DOCUMENTS

| | | |
|---|---|---|
| CN | 105301943 A | 2/2016 |
| CN | 205301943 U | 6/2016 |
| CN | 105981285 A | 9/2016 |
| CN | 106208884 A | 12/2016 |
| CN | 107689764 A | 2/2018 |
| EP | 2405568 A1 | 1/2012 |
| EP | 2405568 B1 | 8/2013 |
| WO | 2016002416 A1 | 4/2017 |

* cited by examiner

SAFE TORQUE OFF (STO) CIRCUIT AND METHOD FOR STO CIRCUIT

CROSS-REFERENCE TO RELATED APPLICATIONS

This is a national stage application which claims priority to International patent application Serial No.: PCT/CN2020/073899, filed on Jan. 22, 2020; and which is herein incorporated by reference in its entirety.

FIELD

Embodiments of the present disclosure generally relate to safe torque off (STO) in a drive, and more particularly, to a STO circuit and a method for the STO circuit.

BACKGROUND

A drive may regulate an AC input power supply to a DC power supply and use an inverter module to regulate the DC supply back to an AC output power supply so as to drive a motor. The voltage and frequency of the drive is variable as desired so as to adjust the speed of the motor. There are more and more applications of the drive in daily life and industrial production fields.

In some cases, the motor needs to be temporarily turned off for the purpose of maintenance or other operations. In order to prevent personnel injury and equipment damage caused by an accidental start-up of the motor, it is necessary to turn off an output torque of the drive in a reliable way to meet safety requirements. The STO is such a security function, which is clearly stipulated in a standard IEC61508. The standard IEC61508 divides functional security into four levels of which the highest level is SIL4.

The STO function of the existing drive is usually that when the STO function is activated, a power supply of a gate driver circuit of the inverter module is cut off through a switching device. In this way, the inverter module would be unable to generate the output torque for the motor. The power supply of the gate driver circuit has a filter capacitance. When the STO function is activated and the switch device is turned off, the voltage of the gate driver circuit may be decreased gradually. During the time before the voltage of the gate driver circuit drops to its minimum normal working voltage threshold, the driving signal would still be transmitted to the gate driver circuit to generate the torque, and its duration depends on a discharge time constant of the power supply. This is not suitable for situations with high requirements on the time from STO activation to the torque off.

In addition, for different topologies of the inverter module, such as IGBT module, Intelligent Power Module (IPM) and Power Integrated Module (PIM), the gate driver circuits have different power supply modes and power off time characteristics. It is difficult to use a common STO design for different topologies of the inverter module. This will lead to designers to design and match STO circuits of the IGBT/PIM/IPM modules separately, which is not conducive to design standardization, and is a waste of resources.

SUMMARY

In view of the foregoing problems, various example embodiments of the present disclosure provide a STO circuit and a method for the STO circuit to reduce the time from the STO activation to the torque off and be compatible with different topologies of the inverter module.

In a first aspect of the present disclosure, example embodiments of the present disclosure provide a STO circuit. The STO circuit comprises: an input suitable for receiving an input signal; first and second channels coupled to the input in parallel and each comprising a switch, a level conversion circuit and an isolation circuit connected in series, each isolation circuit being configured to be turned on when the respective switch is closed and to be turned off when the respective switch is opened; an inverter module comprising high-side and low-side transistors and configured to generate an output signal for driving a motor; a control unit configured to provide a first driving signal for driving the high-side transistors of the inverter module via a first output terminal and a second driving signal for driving the low-side transistors of the inverter module via a second output terminal when both of the switches of the first and second channels are closed; a first switch unit arranged between the first output terminal of the control unit and the inverter module and comprising a first control terminal coupled to the isolation circuit of the first channel; and a second switch unit arranged between the second output terminal of the control unit and the inverter module and comprising a second control terminal coupled to the isolation circuit of the second channel.

In some embodiments, each of the first and second switch units comprises a controllable semiconductor switching device.

In some embodiments, the controllable semiconductor switching device comprises MOSFET.

In some embodiments, the STO circuit further comprises: a first diagnostic circuit coupled to a node between the first switch unit and the inverter module and configured to feed a first diagnostic signal back to the control unit, wherein the first diagnostic signal indicates whether the first switch unit is turned off when the switch of the first channel is opened; and a second diagnostic circuit coupled to a node between the second switch unit and the inverter module and configured to feed a second diagnostic signal back to the control unit, wherein the second diagnostic signal indicates whether the second switch unit is turned off when the switch of the second channel is opened.

In some embodiments, the control unit is further configured to generate a first alarm signal in response to at least one of the first and second diagnostic signals indicating that the respective switch unit is not turned off when both of the switches of the first and second channels are opened.

In some embodiments, the STO circuit further comprises: a third diagnostic circuit coupled to the isolation circuit of the first channel and configured to provide a third diagnostic signal to the control unit, wherein the third diagnostic signal indicates an ON/OFF state of the isolation circuit of the first channel; and a fourth diagnostic circuit coupled to the isolation circuit of the second channel and configured to provide a fourth diagnostic signal to the control unit, wherein the fourth diagnostic signal indicates an ON/OFF state of the isolation circuit of the second channel.

In some embodiments, the STO circuit further comprises a logic circuit coupled to the third and fourth diagnostic circuits and configured to generate a fifth diagnostic signal based on the third and fourth diagnostic signals, wherein the fifth diagnostic signal indicates whether both of the isolation circuits of the first and second channels are turned on when both of the switches of the first and second channels are closed.

In some embodiments, the control unit is further configured to generate a second alarm signal in response to the fifth diagnostic signal indicating at least one of the isolation circuits of the first and second channels is turned off when both of the switches of the first and second channels are closed.

In some embodiments, each of the isolation circuits of the first and second channels comprises an optical coupler.

In some embodiments, the optical coupler is integrated with a Schmitt trigger.

In some embodiments, the inverter module further comprises: a gate driver circuit coupled to the first and second switch units and configured to drive the high-side and low-side transistors based on the first and second driving signals.

In some embodiments, the gate driver circuit is integrated with the high-side and low-side transistors on the same circuit board or arranged on a different circuit board from the high-side and low-side transistors.

In some embodiments, the high-side and low-side transistors are formed into IGBT module, Power Integrated Module (PIM), or Intelligent Power Module (IPM).

In some embodiments, each of the level conversion circuits of the first and second channels comprises: an input filtering circuit coupled to the respective switch and configured to filter the input signal to suppress electromagnetic interference; and a level shift circuit arranged between the input filtering circuit and the respective isolation circuit and configured to perform level shift on the filtered input signal.

In a second aspect of the present disclosure, example embodiments of the present disclosure provide a method for a STO circuit. The STO circuit comprises an input suitable for receiving an input signal; first and second channels coupled to the input in parallel and each comprising a switch, a level conversion circuit and an isolation circuit connected in series, each isolation circuit being configured to be turned on when the respective switch is closed and to be turned off when the respective switch is opened; an inverter module comprising high-side and low-side transistors and configured to generate an output signal for driving a motor; a control unit configured to provide a first driving signal for driving the high-side transistors of the inverter module via a first output terminal and a second driving signal for driving the low-side transistors of the inverter module via a second output terminal when both of the switches of the first and second channels are closed; a first switch unit arranged between the first output terminal of the control unit and the inverter module and comprising a first control terminal coupled to the isolation circuit of the first channel; and a second switch unit arranged between the second output terminal of the control unit and the inverter module and comprising a second control terminal coupled to the isolation circuit of the second channel. The method comprises: in response to both of the switches of the first and second channels being closed, turning on the first and second switch units so as to transmit the first and second driving signals to the inverter module; and in response to the switches of the first and second channels being opened, turning off the first and second switch units so as to block the first and second driving signals from being transmitted to the inverter module.

In some embodiments, the STO circuit further comprises a first diagnostic circuit coupled to a node between the first switch unit and the inverter module and a second diagnostic circuit coupled to a node between the second switch unit and the inverter module, and the method further comprises: feeding, by the first diagnostic circuit, a first diagnostic signal back to the control unit, wherein the first diagnostic signal indicates whether the first switch unit is turned off when the switch of the first channel is opened; and feeding, by the second diagnostic circuit, a second diagnostic signal back to the control unit, wherein the second diagnostic signal indicates whether the second switch unit is turned off when the switch of the second channel is opened.

In some embodiments, the method further comprises: generating, by the control unit, a first alarm signal in response to at least one of the first and second diagnostic signals indicating that the respective switch unit is not turned off when both of the switches of the first and second channels are opened.

In some embodiments, the STO circuit further comprises a third diagnostic circuit coupled to the isolation circuit of the first channel and a fourth diagnostic circuit coupled to the isolation circuit of the second channel, and the method further comprises: providing, by the third diagnostic circuit, a third diagnostic signal to the control unit, wherein the third diagnostic signal indicates an ON/OFF state of the isolation circuit of the first channel; and providing, by the fourth diagnostic circuit, a fourth diagnostic signal to the control unit, wherein the fourth diagnostic signal indicates an ON/OFF state of the isolation circuit of the second channel.

In some embodiments, the STO circuit further comprises a logic circuit coupled to the third and fourth diagnostic circuits, and the method further comprises: generating, by the logic circuit, a fifth diagnostic signal based on the third and fourth diagnostic signals, wherein the fifth diagnostic signal indicates whether both of the isolation circuits of the first and second channels are turned on when both of the switches of the first and second channels are closed.

In some embodiments, the method further comprises: generating, by the control unit, a second alarm signal in response to the fifth diagnostic signal indicating at least one of the isolation circuits of the first and second channels is turned off when both of the switches of the first and second channels are closed.

It is to be understood that the Summary section is not intended to identify key or essential features of embodiments of the present disclosure, nor is it intended to be used to limit the scope of the present disclosure. Other features of the present disclosure will become easily comprehensible through the following description.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
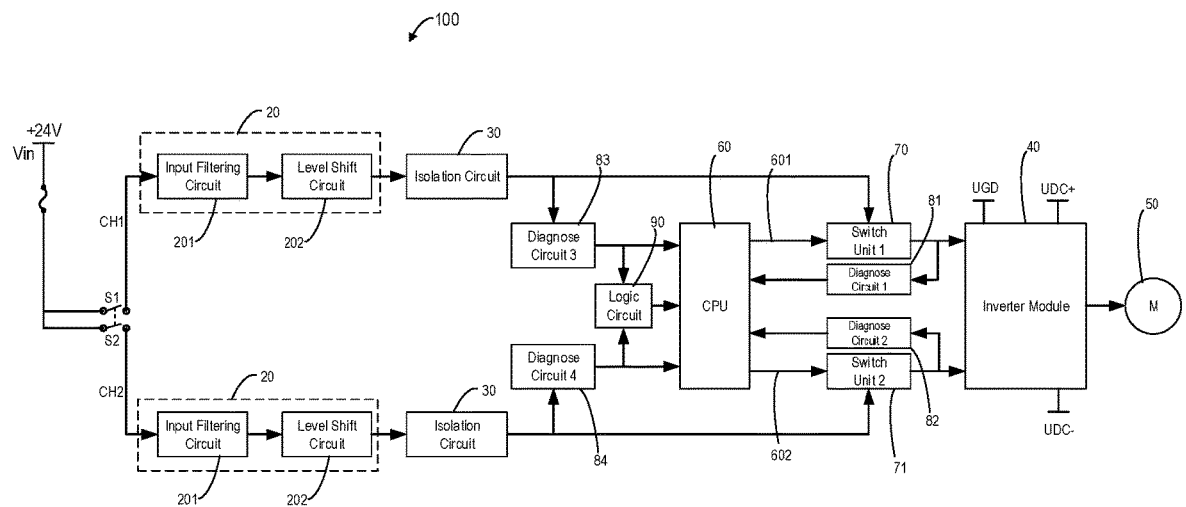
FIG. 1 illustrates a block diagram of a STO circuit in accordance with an embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

As discussed above, the conventional STO function is not suitable for situations with high requirements on the time from STO activation to the torque off, and cannot be compatible with different topologies of the inverter module. According to embodiments of the present disclosure, to reduce the time from the STO activation to the torque off and be compatible with different topologies of the inverter module, two switch units are arranged between the control unit and the inverter module to block the driving signals from being transmitted to the inverter module when the STO function is activated. The above idea may be implemented in various manners, as will be described in detail in the following paragraphs.

Hereinafter, the principles of the present disclosure will be described in detail with reference to FIGS. 1-4. Referring to FIG. 1 first, FIG. 1 illustrates a block diagram of a STO circuit in accordance with an embodiment of the present disclosure. As shown in FIG. 1, the STO circuit 100 includes an input suitable for receiving an input signal Vin, e.g., +24V, or other voltage levels. First and second channels CH1 and CH2 are coupled to the input in parallel to receive the input signal Vin. The first channel CH1 includes a switch S1, a level conversion circuit 20 and an isolation circuit 30 connected in series. The second channel CH2 is a redundant channel of the first channel CH1 and includes a switch S2, a level conversion circuit 20 and an isolation circuit 30 connected in series.

When the switch S1 is closed, the level conversion circuit 20 of the first channel CH1 may perform level conversion on the input signal Vin. Similarly, when the switch S2 is closed, the level conversion circuit 20 of the second channel CH2 may perform level conversion on the input signal Vin. In some embodiments, the level conversion circuit 20 includes an input filtering circuit 201, such as an Electro Magnetic Compatibility (EMC) circuit, and a level shift circuit 202. The input filtering circuit 201 is coupled to the respective switch S1 or S2 to filter the input signal Vin such that electromagnetic interference in the input signal Vin may be suppressed. The level shift circuit 202 is arranged between the input filtering circuit 201 and the respective isolation circuit 30 to perform level shift on the filtered input signal Vin and provide the level-shifted signal to the isolation circuit 30. In other embodiments, the level conversion circuit 20 may be of other configurations. The scope of the present disclosure is not intended to be limited in this respect.

The isolation circuit 30 of the first channel CH1 may be turned on in case that the switch S1 is closed and turned off in case that the switch S1 is opened. Similarly, the isolation circuit 30 of the second channel CH2 may be turned on in case that the switch S2 is closed and turned off in case that the switch S2 is opened. When the isolation circuit 30 is turned on, the isolation circuit 30 may transfer the signal from the respective level conversion circuit 20 to subsequent units of the STO circuit 100 in an electrical isolation manner, as will be described in detail hereinafter.

As shown in FIG. 1, the STO circuit 100 further includes an inverter module 40. The inverter module 40 regulates a DC supply between terminals UDC+ and UDC− to an AC output power supply under control of a control unit so as to drive a motor 50. The inverter module 40 may be of any conventional configuration. For example, in some embodiments, the inverter module 40 includes a gate driver circuit powered by a power supply UGD and receiving driving signals from the control unit 60. The inverter module 40 further includes high-side and low-side transistors driven by the gate driver circuit. In some embodiments, the high-side and low-side transistors are formed into IGBT module, Power Integrated Module (PIM), or Intelligent Power Module (IPM). In other embodiments, the high-side and low-side transistors may be configured in other manners. The scope of the present disclosure is not intended to be limited in this respect.

As shown in FIG. 1, the STO circuit 100 further includes a control unit 60. The control unit 60 may be CPU, DSP, or the like. The control unit 60 is configured to provide first and second driving signals for driving the high-side and low-side transistors of the inverter module 40 when both of the switches S1, S2 of the first and second channels CH1 and CH2 are closed. The control unit 60 provides the first driving signal to the gate driver circuit of the inverter module 40 via a first output terminal 601 so as to drive the high-side transistors of the inverter module 40. The control unit 60 provides the second driving signal to the gate driver circuit of the inverter module 40 via a second output terminal 602 so as to drive the low-side transistors of the inverter module 40.

As shown in FIG. 1, the STO circuit 100 further includes a first switch unit 70 and a second switch unit 71. The first switch unit 70 is arranged between the first output terminal 601 of the control unit 60 and the inverter module 40. A first control terminal of the first switch unit 70 is coupled to the isolation circuit 30 of the first channel CH1 to receive the output signal from the isolation circuit 30. The second switch unit 71 is arranged between the second output terminal 602 of the control unit 60 and the inverter module 40. A second control terminal of the second switch unit 71 is coupled to the isolation circuit 30 of the second channel CH2 to receive the output signal from the isolation circuit 30.

When the STO function is activated, i.e., both or either of the switches S1 and S2 are opened, the respective isolation circuits 30 of the first and second channels CH1 and CH2 would be turned off. In this case, the output signals of the respective isolation circuits 30 of the first and second channels CH1 and CH2 would become low. Accordingly, the first and/or second switch units 70 and 71 may be turned off to block the first and second driving signals from being transmitted to the inverter module 40. Without the first and second driving signals, the inverter module 40 would not generate the AC output power supply for driving the motor 50. Thus, the torque for the motor 50 may be turned off quickly. According to embodiments, the response time from the STO activation to the torque off is relatively short. Moreover, the STO function is based on hardware behavior, independent of software, thus achieving high reliability. Further, since the hardware based cut-off of the driving signal is used to replace the cut-off of the power supply UGD of the gate driver circuit, the STO circuit 100 may be compatible with different topologies of the inverter module 40.

In some embodiments, the STO circuit 100 further includes a first diagnostic circuit 81 and a second diagnostic circuit 82. The first diagnostic circuit 81 is coupled to a node between the first switch unit 70 and the inverter module 40 to feed a first diagnostic signal back to the control unit 60. The first diagnostic signal indicates whether the first switch unit 70 is turned off when the switch S1 of the first channel CH1 is opened. The second diagnostic circuit 82 is coupled to a node between the second switch unit 71 and the inverter module 40 to feed a second diagnostic signal back to the control unit 60. The second diagnostic signal indicates whether the second switch unit 71 is turned off when the switch S2 of the second channel CH2 is opened. Based on the first and second diagnostic signals, the control unit 60 may determine whether the first and second switch units 70 and 71 are actually turned off when the STO function is activated. In response to at least one of the first and second diagnostic signals indicating that the respective switch unit 70, 71 is not turned off when the STO function is activated, the control unit 60 may generate a first alarm signal so as to notify the operator that the torque of the drive is not turned off, thereby preventing personnel injury and equipment damage caused by the accidental start-up of the motor 50.

In some embodiments, the STO circuit 100 further includes a third diagnostic circuit 83 and a fourth diagnostic circuit 84. The third diagnostic circuit 83 is coupled to the isolation circuit 30 of the first channel CH1 to generate a third diagnostic signal based on the output signal from the isolation circuit 30 of the first channel CH1 and provide the third diagnostic signal to the control unit 60. The third diagnostic signal indicates an ON/OFF state of the isolation circuit 30 of the first channel CH1. The fourth diagnostic circuit 84 is coupled to the isolation circuit 30 of the second channel CH2 to generate a fourth diagnostic signal based on the output signal from the isolation circuit 30 of the second channel CH2 and provide the fourth diagnostic signal to the control unit 60. The fourth diagnostic signal indicates an ON/OFF state of the isolation circuit 30 of the second channel CH2.

In some embodiments, the STO circuit 100 further includes a logic circuit 90 coupled to the third and fourth diagnostic circuits 83, 84. The logic circuit 90 generates a fifth diagnostic signal based on the third and fourth diagnostic signals and provides the fifth diagnostic signal to the control unit 60. The fifth diagnostic signal indicates whether both of the isolation circuits 30 of the first and second channels CH1, CH2 are turned on when both of the switches S1, S2 of the first and second channels CH1, CH2 are closed. Based on the fifth diagnostic signal, the control unit 60 may determine whether the isolation circuits 30 of the first and second channels CH1, CH2 are actually turned on when both of the switches S1, S2 are closed. In response to the fifth diagnostic signal indicating at least one of the isolation circuits 30 of the first and second channels CH1, CH2 is turned off when both of the switches S1, S2 are closed, the control unit 60 generates a second alarm signal so as to notify the operator that there is a failure in the first and second channels CH1, CH2 of the STO circuit 100.

Figure 2:
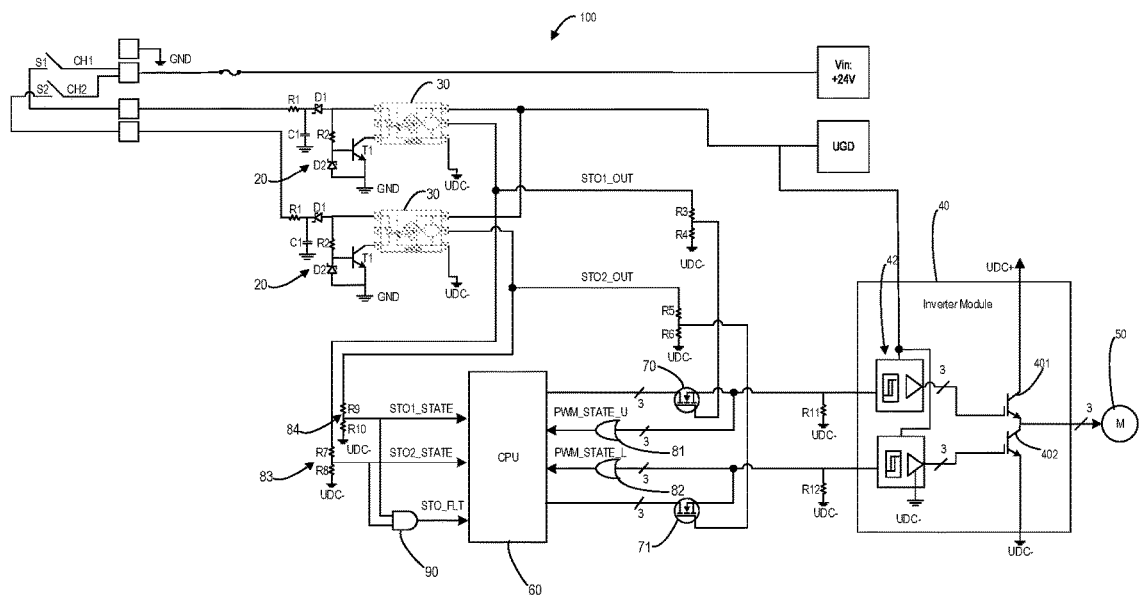
FIG. 2 illustrates a schematic circuit diagram of the STO circuit in accordance with an embodiment of the present disclosure.

FIG. 2 illustrates a schematic circuit diagram of the STO circuit in accordance with an embodiment of the present disclosure. The STO circuit 100 as shown in FIG. 2 is an example implementation of the STO circuit 100 as shown in FIG. 1.

In an embodiment, as shown in FIG. 2, each of the level conversion circuits 20 of the first and second channel CH1, CH2 includes resistors R1 and R2, a capacitor C1, voltage-regulator diodes D1 and D2, and a transistor T1, such as a triode. The resistor R1 and the capacitor C1 form the input filtering circuit 201 to suppress the electromagnetic interference in the input signal Vin, thus preventing the drive nuisance tripping to STO due to short glitches in the signal or due to short diagnostic pulses. The resistor R2, the diodes D1 and D2, and the triode T1 form the level shift circuit 202 to perform level shift on the filtered input signal Vin. The isolation circuit 30 includes an optical coupler. The optical coupler includes a light emitting diode (LED) connected between a first input pin and a second input pin. The optical coupler further includes a photosensitive diode configured to receive light from the LED and generate an output signal.

In each of the first and second channels CH1, CH2, the resistor R1 and the capacitor C1 are connected in series between the respective switch S1, S2 and ground GND. The diode D1 is arranged between the resistor R1 and the first input pin of the optical coupler. The resistor R2 and the diode D2 are connected in series between the first input pin of the optical coupler and ground GND. A base of the triode T1 is connected to a node between the resistor R2 and the diode D2. A collector of the triode T1 is connected to the second input pin of the optical coupler. An emitter of the triode T1 is connected to ground GND.

In some embodiments, the optical coupler of the isolation circuit 30 is integrated with a Schmitt trigger for performing wave shaping on the output signal of the photosensitive diode. In other embodiments, the Schmitt trigger may be arranged outside the isolation circuit 30. The scope of the present disclosure is not intended to be limited in this respect.

As shown in FIG. 2, the output signal STO1_OUT of the isolation circuit 30 of the first channel CH1 is provided to a first voltage divider formed by resistors R3 and R4. A node between the resistors R3 and R4 is connected to the control terminal of the first switch unit 70. A divided voltage signal outputted by the first voltage divider is provided to the control terminal of the first switch unit 70 so as to control the ON/OFF state of the first switch unit 70. The output signal STO2_OUT of the isolation circuit 30 of the second channel CH2 is provided to a second voltage divider formed by resistors R5 and R6. A node between the resistors R5 and R6 is connected to the control terminal of the second switch unit 71. A divided voltage signal outputted by the second voltage divider is provided to the control terminal of the second switch unit 71 so as to control the ON/OFF state of the second switch unit 71. In some embodiments, each of the first and second switch units 70, 71 includes a controllable semiconductor switching device, such as MOSFET. In other embodiments, each of the first and second switch units 70, 71 may include other types of switching devices. The scope of the present disclosure is not intended to be limited in this respect.

When the STO function is activated, i.e., both of the switches S1 and S2 are opened, the isolation circuits 30 of the first and second channels CH1 and CH2 would be turned off. In this case, the output signals STO1_OUT and STO2_OUT of the isolation circuits 30 would become low. Accordingly, the first and second switch units 70 and 71 may be turned off, thereby blocking the first and second driving signals from being transmitted to the inverter module 40. Without the first and second driving signals, the inverter module 40 would not generate the AC output power supply for driving the motor 50. Thus, the torque for the motor 50 may be turned off quickly.

In some embodiments, each of the first and second diagnostic circuits 81 and 82 includes an OR gate. The first diagnostic signal PWM_STATE_U generated by the first diagnostic circuit 81 is provided to the control unit 60. The second diagnostic signal PWM_STATE_L generated by the second diagnostic circuit 82 is provided to the control unit 60. Based on the first diagnostic signal PWM_STATE_U and the second diagnostic signal PWM_STATE_L, the control unit 60 may determine whether the first and second switch units 70 and 71 are actually turned off when the STO function is activated. In other embodiments, each of the first and second diagnostic circuits 81 and 82 may be of other configurations. The scope of the present disclosure is not intended to be limited in this respect.

In some embodiments, the third diagnostic circuit 83 includes a third voltage divider formed by resistors R7 and R8. The resistors R7 and R8 are connected in series between the output of the isolation circuit 30 of the first channel CH1 and the terminal UDC−. A divided voltage signal STO1_STATE generated by the third voltage divider is inputted into the control unit 60 as the third diagnostic signal. The third diagnostic signal STO1_STATE indicates the ON/OFF state of the isolation circuit 30 of the first channel CH1.

In some embodiments, the fourth diagnostic circuit 84 includes a fourth voltage divider formed by resistors R9 and R10. The resistors R9 and R10 are connected in series between the output of the isolation circuit 30 of the second channel CH2 and the terminal UDC−. A divided voltage signal STO2_STATE generated by the fourth voltage divider is inputted into the control unit 60 as the fourth diagnostic signal. The fourth diagnostic signal STO2_STATE indicates the ON/OFF state of the isolation circuit 30 of the second channel CH2.

In other embodiments, each of the third and fourth diagnostic circuits 83 and 84 may be of other configurations. The scope of the present disclosure is not intended to be limited in this respect.

In some embodiments, the logic circuit 90 includes an AND gate. The third diagnostic signal STO1_STATE and the fourth diagnostic signal STO2_STATE are inputted into the AND gate. The AND gate generates the fifth diagnostic signal STO_FLT based on the third diagnostic signal STO1_STATE and the fourth diagnostic signal STO2_STATE and provides the fifth diagnostic signal STO_FLT to the control unit 60. Based on the fifth diagnostic signal STO_FLT, the control unit 60 may determine whether the isolation circuits 30 of the first and second channels CH1, CH2 are actually turned on when both of the switches S1, S2 are closed. In other embodiments, the logic circuit 90 may be of other configurations. The scope of the present disclosure is not intended to be limited in this respect.

In some embodiments, as shown in FIG. 2, the inverter module 40 includes a gate driver circuit 42 and high-side and low-side transistors 401, 402 driven by the gate driver circuit 42. The gate driver circuit 42 is powered by the power supply UGD and connected to the first and second switch units 70, 71 to receive the driving signals from the control unit 60. The high-side and low-side transistors 401, 402 are connected in series between the terminals UDC+ and UDC−. The high-side and low-side transistors 401, 402 may be formed into IGBT module, Power Integrated Module (PIM), or Intelligent Power Module (IPM).

In some embodiments, as shown in FIG. 2, the gate driver circuit 402 is integrated with the high-side and low-side transistors 401, 402 on the same circuit board. In other embodiments, the gate driver circuit 402 is arranged on a different circuit board from the high-side and low-side transistors 401, 402. The scope of the present disclosure is not intended to be limited in this respect.

In some embodiments, as shown in FIG. 2, a resistor R11 is connected between a node between the first switch unit 70 and the gate driver circuit 42 and the terminal UDC−. Similarly, a resistor R12 is connected between a node between the second switch unit 71 and the gate driver circuit 42 and the terminal UDC−.

With the STO circuit 100 as described above with reference to FIG. 2, when the STO function is activated, the isolation circuits 30 of the first and second channels CH1 and CH2 would be turned off. In this case, the output signals STO1_OUT and STO2_OUT of the isolation circuits 30 would become low. Accordingly, the first and second switch units 70 and 71 may be turned off, thereby blocking the first and second driving signals from being transmitted to the inverter module 40. In this way, the torque for the motor 50 may be turned off quickly.

Figure 3:
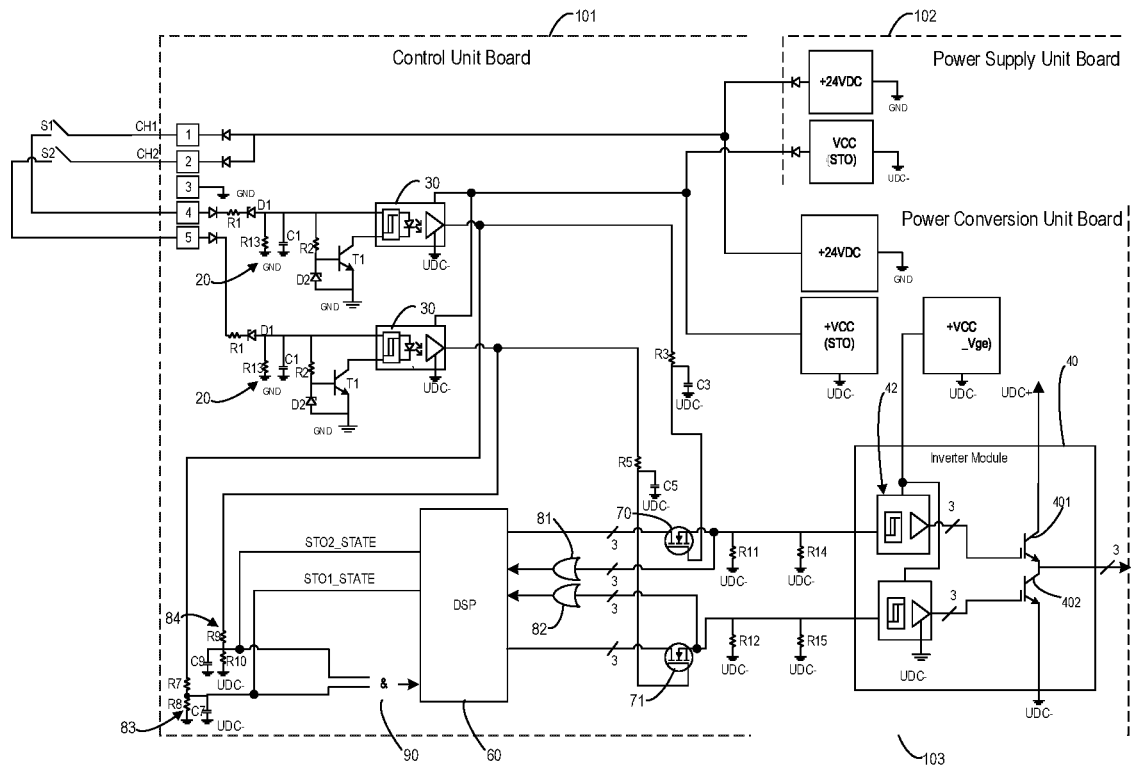
FIG. 3 illustrates a schematic circuit diagram of the STO circuit in accordance with another embodiment of the present disclosure.

FIG. 3 illustrates a schematic circuit diagram of the STO circuit in accordance with another embodiment of the present disclosure. The configuration of the STO circuit 100 as shown in FIG. 3 is similar to that of the STO circuit 100 as shown in FIG. 2. In the following, only the difference between the STO circuits 100 as shown in FIGS. 2 and 3 will be described in detail, and the same portions will not be described again.

In some embodiments, as shown in FIG. 3, each of the level conversion circuits 20 of the first and second channel CH1, CH2 includes resistors R1, R2 and R13, a capacitor C1, voltage-regulator diodes D1 and D2, and a triode T1. The resistor R1 and the diode D1 are coupled in series between the respective switch S1, S2 and the first input pin of the optical coupler. The resistor R13 is connected between the first input pin of the optical coupler and ground GND. The capacitor C1 is connected between the first input pin of the optical coupler and ground GND. The resistor R2 and the diode D2 are connected in series between the first input pin of the optical coupler and ground GND. A base of the triode T1 is connected to a node between the resistor R2 and the diode D2. A collector of the triode T1 is connected to the second input pin of the optical coupler. An emitter of the triode T1 is connected to ground GND.

In some embodiments, as shown in FIG. 3, in addition to the resistors R7 and R8, the third diagnostic circuit 83 further includes a capacitor C7. The capacitor C7 is connected between the middle node of the resistors R7 and R8 and the terminal UDC−. Similarly, in addition to the resistors R9 and R10, the fourth diagnostic circuit 84 further includes a capacitor C9. The capacitor C9 is connected between the middle node of the resistors R9 and R10 and the terminal UDC−.

In some embodiments, as shown in FIG. 3, the control signal applied on the control terminal of the first switch unit 70 is supplied by a resistor R3 and a capacitor C3 connected in series between the output of the isolation circuit 30 of the first channel CH1 and the terminal UDC−. Similarly, the control signal applied on the control terminal of the second switch unit 71 is supplied by a resistor R5 and a capacitor C5 connected in series between the output of the isolation circuit 30 of the second channel CH2 and the terminal UDC−.

In some embodiments, as shown in FIG. 3, a resistor R14 is connected between the node between the first switch unit 70 and the gate driver circuit 42 and the terminal UDC−. Similarly, a resistor R15 is connected between the node between the second switch unit 71 and the gate driver circuit 42 and the terminal UDC−.

In some embodiments, as shown in FIG. 3, the STO circuit 100 may be implemented on multiple circuit boards, e.g., a control unit board 101, a power supply unit board 102, and a power conversion unit board 103. The power supply modules of the STO circuit 100 may be arranged on the power supply unit board 102. The inverter module 40 may be arranged on the power conversion unit board 103. The channels CH1 and CH2, the control unit 60, the first and second switching units 70 and 71, the first to fourth diagnostic circuits 81-84, and the logic circuit 90 may be substantially arranged on the control unit board 101. It is to be understood that the above arrangement is only an example for illustrating the principle of the present disclosure and those skilled in the art would readily envisage other arrangements of the STO circuit 100 based on the knowledge of the present disclosure.

Figure 4:
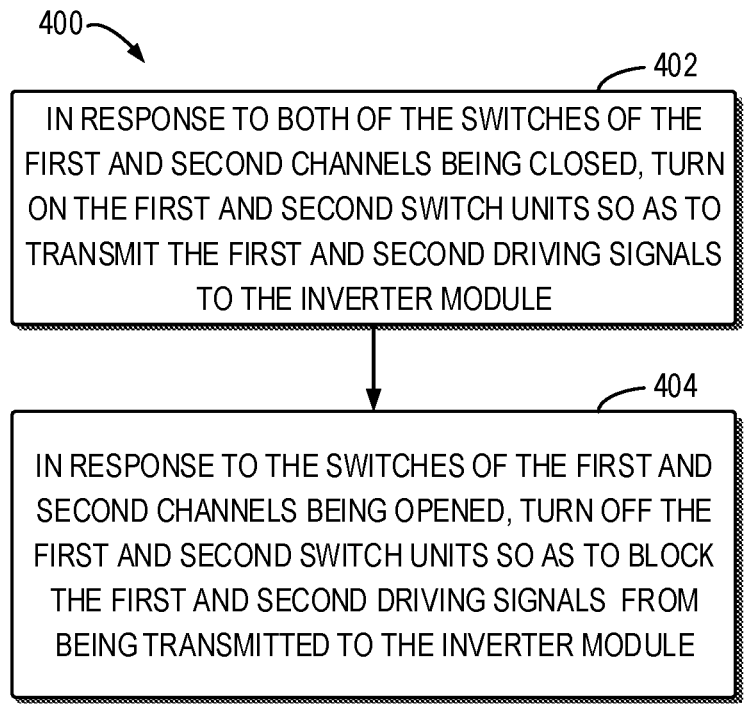
FIG. 4 is a flowchart illustrating a method for the STO circuit in accordance with an embodiment of the present disclosure.

Example embodiments of the present disclosure also provide a method for the STO circuit 100. FIG. 4 is a flowchart illustrating a method 400 for the STO circuit 100 in accordance with an embodiment of the present disclosure. As shown in FIG. 4, at 402, in response to both of the switches S1, S2 of the first and second channels CH1, CH2 being closed, the first and second switch units 70, 71 are turned on so as to transmit the first and second driving signals to the inverter module 40. At 404, in response to the switches S1, S2 of the first and second channels CH1, CH2 being opened, the first and second switch units 70, 71 are turn off so as to block the first and second driving signals from being transmitted to the inverter module 40.

In some embodiments, the method 400 further comprises: feeding, by the first diagnostic circuit 81, a first diagnostic signal back to the control unit 60, wherein the first diagnostic signal indicates whether the first switch unit 70 is turned off when the switch S1 of the first channel CH1 is opened; and feeding, by the second diagnostic circuit 82, a second diagnostic signal back to the control unit 60, wherein the second diagnostic signal indicates whether the second switch unit 71 is turned off when the switch S2 of the second channel CH2 is opened.

In some embodiments, the method 400 further comprises: generating, by the control unit 60, a first alarm signal in response to at least one of the first and second diagnostic signals indicating that the respective switch unit 70, 71 is not turned off when both of the switches S1, S2 of the first and second channels CH1, CH2 are opened.

In some embodiments, the method 400 further comprises: providing, by the third diagnostic circuit 83, a third diagnostic signal to the control unit 60, wherein the third diagnostic signal indicates an ON/OFF state of the isolation circuit 30 of the first channel CH1; and providing, by the fourth diagnostic circuit 84, a fourth diagnostic signal to the control unit 60, wherein the fourth diagnostic signal indicates an ON/OFF state of the isolation circuit 30 of the second channel CH2.

In some embodiments, the method 400 further comprises: generating, by the logic circuit 90, a fifth diagnostic signal based on the third and fourth diagnostic signals, wherein the fifth diagnostic signal indicates whether both of the isolation circuits 30 of the first and second channels CH1, CH2 are turned on when both of the switches S1, S2 of the first and second channels CH1, CH2 are closed.

In some embodiments, the method 400 further comprises: generating, by the control unit 60, a second alarm signal in response to the fifth diagnostic signal indicating at least one of the isolation circuits 30 of the first and second channels CH1, CH2 is turned off when both of the switches S1, S2 of the first and second channels CH1, CH2 are closed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A safe torque off (STO) circuit comprising:
   an input suitable for receiving an input signal;
   first and second channels coupled to the input in parallel and each comprising a switch, a level conversion circuit and an isolation circuit connected in series, each isolation circuit being configured to be turned on when the respective switch is closed and to be turned off when the respective switch is opened;
   an inverter module comprising high-side and low-side transistors and configured to generate an output signal for driving a motor;
   a control unit configured to provide a first driving signal for driving the high-side transistors of the inverter module via a first output terminal and a second driving signal for driving the low-side transistors of the inverter module via a second output terminal when both of the switches of the first and second channels are closed;
   a first switch unit arranged between the first output terminal of the control unit and the inverter module and comprising a first control terminal coupled to the isolation circuit of the first channel; and a second switch unit arranged between the second output terminal of the control unit and the inverter module and comprising a second control terminal coupled to the isolation circuit of the second channel.

2. The STO circuit according to claim 1, wherein each of the first and second switch units comprises a controllable semiconductor switching device.

3. The STO circuit according to claim 2, wherein the controllable semiconductor switching device comprises MOSFET.

4. The STO circuit according to claim 1, further comprising:
a first diagnostic circuit coupled to a node between the first switch unit and the inverter module and configured to feed a first diagnostic signal back to the control unit, wherein the first diagnostic signal indicates whether the first switch unit is turned off when the switch of the first channel is opened; and
a second diagnostic circuit coupled to a node between the second switch unit and the inverter module and configured to feed a second diagnostic signal back to the control unit, wherein the second diagnostic signal indicates whether the second switch unit is turned off when the switch of the second channel is opened.

5. The STO circuit according to claim 4, wherein the control unit is further configured to generate a first alarm signal in response to at least one of the first and second diagnostic signals indicating that the respective switch unit is not turned off when both of the switches of the first and second channels are opened.

6. The STO circuit according to claim 1, further comprising:
a third diagnostic circuit coupled to the isolation circuit of the first channel and configured to provide a third diagnostic signal to the control unit, wherein the third diagnostic signal indicates an ON/OFF state of the isolation circuit of the first channel; and
a fourth diagnostic circuit coupled to the isolation circuit of the second channel and configured to provide a fourth diagnostic signal to the control unit, wherein the fourth diagnostic signal indicates an ON/OFF state of the isolation circuit of the second channel.

7. The STO circuit according to claim 6, further comprising a logic circuit coupled to the third and fourth diagnostic circuits and configured to generate a fifth diagnostic signal based on the third and fourth diagnostic signals, wherein the fifth diagnostic signal indicates whether both of the isolation circuits of the first and second channels are turned on when both of the switches of the first and second channels are closed.

8. The STO circuit according to claim 7, wherein the control unit is further configured to generate a second alarm signal in response to the fifth diagnostic signal indicating at least one of the isolation circuits of the first and second channels is turned off when both of the switches of the first and second channels are closed.

9. The STO circuit according to claim 1, wherein each of the isolation circuits of the first and second channels comprises an optical coupler.

10. The STO circuit according to claim 9, wherein the optical coupler is integrated with a Schmitt trigger.

11. The STO circuit according to claim 1, wherein the inverter module further comprises:
a gate driver circuit coupled to the first and second switch units and configured to drive the high-side and low-side transistors based on the first and second driving signals.

12. The STO circuit according to claim 11, wherein the gate driver circuit is integrated with the high-side and low-side transistors on the same circuit board or arranged on a different circuit board from the high-side and low-side transistors.

13. The STO circuit according to claim 1, wherein the high-side and low-side transistors are formed into IGBT module, Power Integrated Module (PIM), or Intelligent Power Module (IPM).

14. The STO circuit according to claim 1, wherein each of the level conversion circuits of the first and second channels comprises:
an input filtering circuit coupled to the respective switch and configured to filter the input signal to suppress electromagnetic interference; and
a level shift circuit arranged between the input filtering circuit and the respective isolation circuit and configured to perform level shift on the filtered input signal.

15. A method for a safe torque off (STO) circuit, the STO circuit comprising an input suitable for receiving an input signal; first and second channels coupled to the input in parallel and each comprising a switch, a level conversion circuit and an isolation circuit connected in series, each isolation circuit being configured to be turned on when the respective switch is closed and to be turned off when the respective switch is opened; an inverter module comprising high-side and low-side transistors and configured to generate an output signal for driving a motor; a control unit configured to provide a first driving signal for driving the high-side transistors of the inverter module via a first output terminal and a second driving signal for driving the low-side transistors of the inverter module via a second output terminal when both of the switches of the first and second channels are closed; a first switch unit arranged between the first output terminal of the control unit and the inverter module and comprising a first control terminal coupled to the isolation circuit of the first channel; and a second switch unit arranged between the second output terminal of the control unit and the inverter module and comprising a second control terminal coupled to the isolation circuit of the second channel, the method comprising:
in response to both of the switches of the first and second channels being closed, turning on the first and second switch units so as to transmit the first and second driving signals to the inverter module; and
in response to the switches of the first and second channels being opened, turning off the first and second switch units so as to block the first and second driving signals from being transmitted to the inverter module.

16. The method according to claim 15, wherein the STO circuit further comprises a first diagnostic circuit coupled to a node between the first switch unit and the inverter module and a second diagnostic circuit coupled to a node between the second switch unit and the inverter module, and wherein the method further comprises:
feeding, by the first diagnostic circuit, a first diagnostic signal back to the control unit, wherein the first diagnostic signal indicates whether the first switch unit is turned off when the switch of the first channel is opened; and
feeding, by the second diagnostic circuit, a second diagnostic signal back to the control unit, wherein the second diagnostic signal indicates whether the second switch unit is turned off when the switch of the second channel is opened.

17. The method according to claim 16, further comprising:

generating, by the control unit, a first alarm signal in response to at least one of the first and second diagnostic signals indicating that the respective switch unit is not turned off when both of the switches of the first and second channels are opened.

18. The method according to claim 15, wherein the STO circuit further comprises a third diagnostic circuit coupled to the isolation circuit of the first channel and a fourth diagnostic circuit coupled to the isolation circuit of the second channel, and wherein the method further comprises:
- providing, by the third diagnostic circuit, a third diagnostic signal to the control unit, wherein the third diagnostic signal indicates an ON/OFF state of the isolation circuit of the first channel; and
- providing, by the fourth diagnostic circuit, a fourth diagnostic signal to the control unit, wherein the fourth diagnostic signal indicates an ON/OFF state of the isolation circuit of the second channel.

19. The method according to claim 18, wherein the STO circuit further comprises a logic circuit coupled to the third and fourth diagnostic circuits, and wherein the method further comprises:
- generating, by the logic circuit, a fifth diagnostic signal based on the third and fourth diagnostic signals, wherein the fifth diagnostic signal indicates whether both of the isolation circuits of the first and second channels are turned on when both of the switches of the first and second channels are closed.

20. The method according to claim 19, further comprising:
- generating, by the control unit, a second alarm signal in response to the fifth diagnostic signal indicating at least one of the isolation circuits of the first and second channels is turned off when both of the switches of the first and second channels are closed.

* * * * *